(12) United States Patent
Kanetake et al.

(10) Patent No.: US 7,522,592 B2
(45) Date of Patent: Apr. 21, 2009

(54) PACKET TRANSFER UNIT

(75) Inventors: Tatsuo Kanetake, Kawasaki (JP);
Kazuo Sugai, Hadano (JP); Takashi Kumagai, Isehara (JP)

(73) Assignee: Hitachi, Ltd., Tokyo (JP)

( * ) Notice: Subject to any disclaimer, the term of this patent is extended or adjusted under 35 U.S.C. 154(b) by 712 days.

(21) Appl. No.: 10/954,475

(22) Filed: Oct. 1, 2004

(65) Prior Publication Data
US 2005/0074009 A1    Apr. 7, 2005

(30) Foreign Application Priority Data
Oct. 3, 2003    (JP)    ............... 2003-346048

(51) Int. Cl.
*H04L 12/28* (2006.01)
*H04L 12/56* (2006.01)
(52) U.S. Cl. .................. 370/389; 370/392; 370/401
(58) Field of Classification Search .......... 370/389, 370/392, 401–404
See application file for complete search history.

(56) References Cited

U.S. PATENT DOCUMENTS

| 5,491,703 | A   |   | 2/1996  | Barnaby et al. |         |
|-----------|-----|---|---------|----------------|---------|
| 7,003,625 | B2  | * | 2/2006  | King           | 711/108 |
| 7,117,301 | B1  | * | 10/2006 | James et al.   | 711/108 |
| 7,167,471 | B2  | * | 1/2007  | Calvignac et al. | 370/389 |
| 2001/0037396 | A1 | * | 11/2001 | Tallegas et al. | 709/230 |
| 2003/0048785 | A1 | * | 3/2003  | Calvignac et al. | 370/392 |
| 2003/0053460 | A1 | * | 3/2003  | Suda et al.    | 370/392 |
| 2003/0227925 | A1 | * | 12/2003 | Matsuo et al.  | 370/395.32 |

FOREIGN PATENT DOCUMENTS

| JP | 63-121947  | 11/1986 |
|----|------------|---------|
| JP | 10-027481  | 7/1996  |
| JP | 11-328044  | 5/1998  |
| JP | 2002-279785 | 3/2001 |

OTHER PUBLICATIONS

Office Action from Japanese Patent Office dated Sep. 26, 2008, in Japanese.

* cited by examiner

*Primary Examiner*—Edan Orgad
*Assistant Examiner*—Chuong T Ho
(74) *Attorney, Agent, or Firm*—Reed Smith LLP; Juan Carlos A. Marquez, Esq.

(57) ABSTRACT

The present invention relates to a packet transfer unit, which comprises a search key memory that stores a search key for a transfer destination of a packet and verification information generated from the search key, in association with a storage location of transfer information memorized in a transfer information memory, wherein a transfer information acquisition unit searches the search key memory by using the search key generated based on the header information and the verification information generated from the search key, acquires storage location information of the transfer information from the search key memory when a match with the search key and the verification information memorized in the search key memory is found, and acquires the transfer information stored in the transfer information memory based on the acquired storage location information, and wherein a transfer unit transfers the packet based on the acquired transfer information.

22 Claims, 10 Drawing Sheets

*FIG. 3*

| CAM SEARCH KEY | 0 | 0 | 0 | ... | 0 | 0 | 0 | 1 | 1 | 0 |

| Database Entry | N | N-1 | N-2 | ... | 4 | 3 | 2 | 1 | 0 | Parity |
|---|---|---|---|---|---|---|---|---|---|---|
| 0x0_0000 | 0 | 0 | 0 | | 0 | 0 | 0 | 1 | 0 | 1 |
| 0x0_0001 | 0 | 0 | 0 | | 0 | 0 | 0 | 0 | 1 | 1 |
| 0x0_0002 | 0 | 0 | 0 | | 0 | 0 | 0 | 1 | 1 | 0 |
| 0x0_0003 | 0 | 0 | 0 | | 0 | 0 | 1 | 0 | 0 | 1 |
| 0x0_0004 | 0 | 0 | 0 | | 0 | 0 | 1 | 1 | 0 | 0 |
| 0x0_0005 | | | | | | | 1 | 1 | 0 | 0 |
| 0x0_7FFF | * | * | * | | 1 | 1 | 1 | 1 | 1 | 1 |

Search →

FIG. 4

| CAM SEARCH KEY | 0 | 0 | 0 | 0 | 0 | 0 | 1 | 1 | 0 |
|---|---|---|---|---|---|---|---|---|---|

Search ↓

| | | | | | | | | | |
|---|---|---|---|---|---|---|---|---|---|
| 0x0_0000 | 0 | 0 | 0 | 0 | 0 | 0 | 0 | 1 | 1 |
| 0x0_0001 | 0 | 0 | 0 | 0 | 0 | 1 | 1 | 1 | 1 |
| 0x0_0002 | 0 | 0 | 0 | 0 | 0 | 0 | 1 | 1 | 0 |
| 0x0_0003 | 0 | 0 | 0 | 0 | 1 | 0 | 0 | 0 | 1 |

FIG. 6

CAM SEARCH KEY

| 0 | 0 | 0 | 0 | 0 | 1 | 1 | 0 |
|---|---|---|---|---|---|---|---|

Search ↓

| Database Entry | N | N-1 | N-2 | . . . | 4 | 3 | 2 | 1 | 0 | Parity |
|---|---|---|---|---|---|---|---|---|---|---|
| 0x0_0000 | 0 | 0 | 0 | | 0 | 0 | 0 | 1 | 0 | 1 |
| 0x0_0001 | 0 | 0 | 0 | | 0 | 0 | 0 | 0 | 1 | 1 |
| 0x0_0002 | 0 | 0 | 0 | | 0 | 0 | 0 | 1 | 0 | 0 |
| 0x0_0003 | 0 | 0 | 0 | | 0 | 0 | 0 | 0 | 1 | 0 |
| 0x0_0004 | 0 | 0 | 0 | | 0 | 0 | 1 | 1 | 1 | 0 |
| 0x0_0005 | | | | | | | 1 | 0 | 1 | 0 |
| 0x0_7FFF | * | * | * | | 1 | 1 | 1 | 1 | 1 | 1 |

# PACKET TRANSFER UNIT

CROSS-REFERENCE TO RELATED APPLICATION

The present application claims priority from Japanese Patent Application JP 2003-346048 filed on Oct. 3, 2003, the content of which is hereby incorporated by reference into this application.

TECHNICAL FIELD OF THE INVENTION

The present invention relates to a packet transfer unit such as a switch. More particularly, the present invention relates to a packet unit that can prevent erroneous searching of transfer information provided in the packet unit.

BACKGROUND OF THE INVENTION

A LAN switch is used to connect a network to which computer equipment such as a server and a client terminal is connected and to route a packet that is transmitted and received between servers to a target server.

A LAN switch connects a network, to which each server is connected, to physically different ports. When receiving a packet sent from a server, the switch analyzes the packet, determines a destination of the packet, and sends out the packet to a port to which a network serving as a route to the destination server is connected.

A LAN switch retains, as FDB (Forwarding DataBase), transfer information to be used to determine to which port a received packet is sent. The LAN switch receives a packet, analyzes a header of the received packet, searches the FDB based on result of the analysis, determines a destination of the packet, and sends out the packet to the determined destination port.

Particularly in recent years, as high-speed broadband networks have become prevalent, a demand for high-speed LAN switch has also been growing. The LAN switch is provided with a buffer for temporarily storing received packets. However, simultaneous arrival of a number of packets and long processing time of them may cause overflow of the buffer, and a packet loss that prevents the transfer of packets may occur in some cases.

For its solution, a method that enables high-speed searching of FDB has been proposed in order to increase the searching speed of the FDB. That is, rather than directly searching and acquiring the contents of the FDB, an address that stores FDB entries corresponding to packets and unique character strings (search keys) to be created from packets are stored into separate memories, and an address where an FDB entry is stored is acquired from a memory that contains search keys and is accessible at high speed. In this manner, the high-speed searching of the FDB can be achieved.

CAM (Content Addressable Memory: associative memory) is used for the high-speed memory. The CAM is a memory capable of calling the recorded contents by not an address (RAW, COLUMN) but by the contents themselves. To be specific, when searching for CAM data, it is possible to acquire an address where the data is recorded if the data entered in the CAM matches the data recorded in the CAM.

However, due to the effects of radiations such as alpha ray resulting from impurities contained in chips or cosmic ray (gamma ray), soft errors may occur wherein data recorded in the CAM suffers from bit inversion and the data is changed.

The CAM using parities to detect the soft errors and correct the data is also known (refer to U.S. Pat. No. 5,491,703).

SUMMARY OF THE INVENTION

By using the CAM for searching the FDB of the LAN switch, the operation speed of the LAN switch can be increased and a possible buffer overflow and packet loss can be prevented. If a soft error occurs in the CAM used in this LAN switch, data contained in the CAM is likely to change and packets might be transferred to wrong addresses. In particular, when the LAN switch is used in VLAN (Virtual Local Area Network) such as VPN (Virtual Private Network) or VMAN (Virtual Metropolitan Area Network), addresses are identified by VLAN number. Therefore, a packet is transferred to a network that is different from a destination network because an erroneous search key is searched due to the bit inversion caused by a soft error and an erroneous entry is obtained from the FDB.

In addition, even though error correction mechanism such as parities is introduced in the CAM, there would still remain the problem of timing at which an error is to be corrected. In other words, even if error correction of the data contained in the CAM is made at given timing, the error cannot be corrected if a soft error occurs immediately before the searching of the FDB. In addition, although an error can be corrected by using parities when the FDB is searched, this will lose the advantages of CAM, namely, high-speed searching of data because the error correction is time-consuming.

The present invention is made in view of the above-mentioned problems and an object of the present invention is to provide a LAN switch that can prevent erroneous transfer due to an error in CAM used for FDB of the LAN switch.

The present invention provides a packet transfer unit, which comprises: an input/output unit that transmits/receives a packet; a transfer unit that extracts header information from a received packet and determines a transfer destination of the packet; a transfer information memory that stores transfer information for determining the transfer destination of the packet; and a transfer information acquisition unit that acquires the transfer information of the packet from the transfer information memory, wherein the packet transfer unit further comprises: a search key memory that stores a search key for the transfer destination of the packet and verification information generated from the search key, in association with a storage location of the transfer information memorized in the transfer information memory, the transfer information acquisition unit searches the search key memory by using the search key generated based on the header information and the verification information generated from the search key, acquires storage location information of the transfer information from the search key memory when a match with the search key stored in the search key memory and the verification information is found, and acquires the transfer information memorized in the transfer information memory based on the acquired storage location information, and the transfer unit transfers the received packet based on the acquired transfer information.

According to the present invention, when a match of a search key and verification information stored in a search key memory is found, storage location information of the transfer information is acquired from the search key memory, and the transfer information stored in a transfer information memory is acquired based on the acquired storage location information. Hence, the acquisition of erroneous transfer information can be prevented by using the verification information even when a soft error occurs in the location information stored in the search key memory and the data is changed, and thus, the erroneous transfer of packets can be prevented.

BRIEF DESCRIPTIONS OF THE DRAWINGS

FIG. 3 is an explanatory diagram of a search table stored in CAM 101 in the first embodiment of the present invention;

FIG. 4 is an explanatory diagram of the state in which a soft error occurs in the search table shown in FIG. 3 in the first embodiment of the present invention;

FIG. 6 is an explanatory diagram of the state in which a soft error occurs in the search table shown in FIG. 5;

DESCRIPTIONS OF THE PREFERRED EMBODIMENTS

Hereinafter, embodiments of the present invention will be described with reference to the accompanying drawings.

Figure 1:
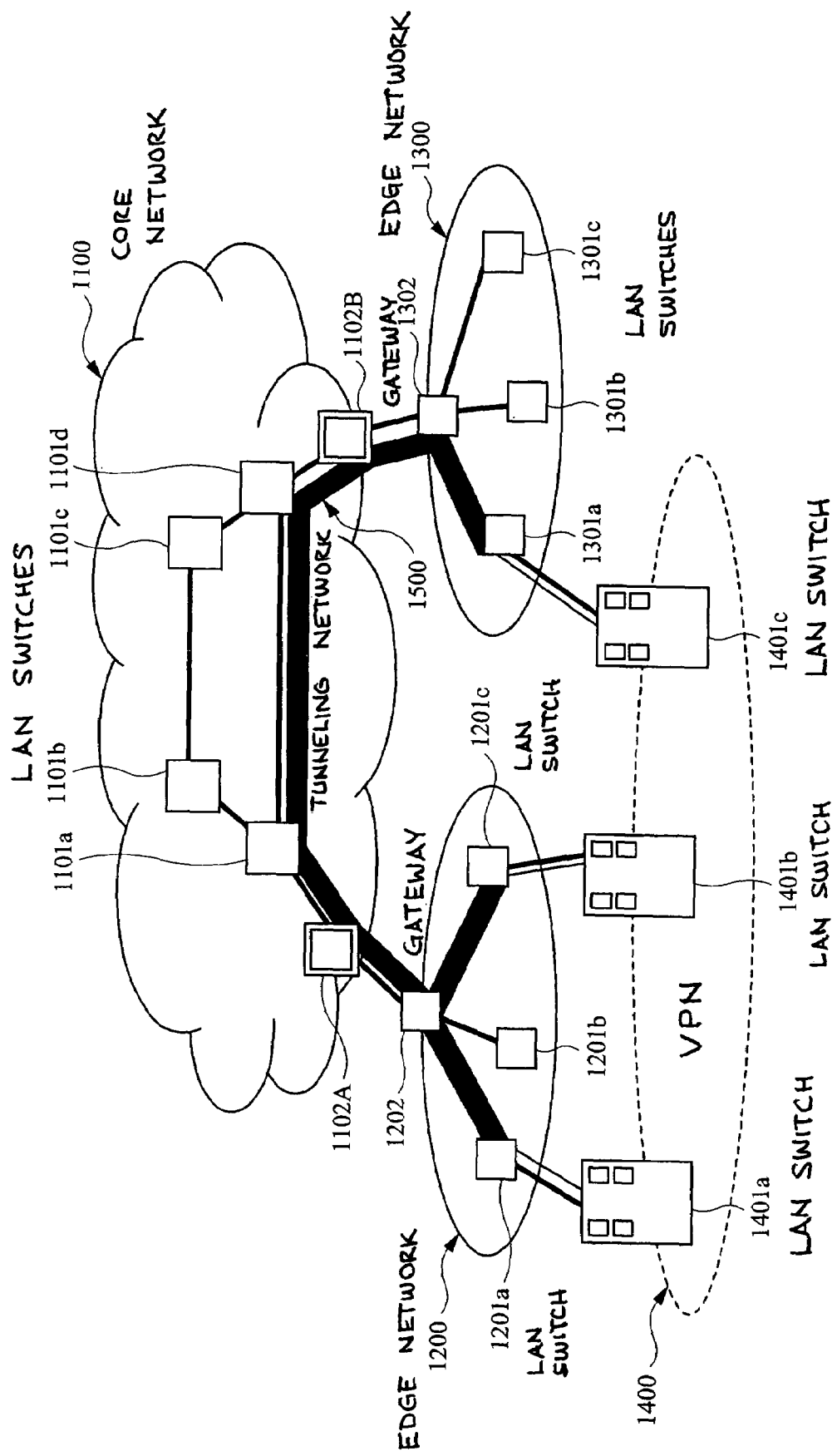
FIG. 1 is a block diagram showing configuration of a network system in a first embodiment of the present invention.

FIG. 1 is a block diagram showing configuration of a network system in the first embodiment of the present invention.

A plurality of edge networks (1200, 1300) are connected to a core network 1100. The core network 1100 consists of a broadband network provided by, for example, a communications carrier and the edge networks 1200 and 1300 consist of an access network or concentration network provided by, for example, a communications carrier.

The core network 1100 is provided with a plurality of LAN switches (1101a, 1101b, 1101c, 1101d) and gateways (1102A, 1102B), each of which is connected by the network. The LAN switches (1101a to 1101d) and gateways (1102A, 1102B) function as a packet transfer unit.

The edge network 1200 is provided with a gateway 1302 and LAN switches (1201a, 1201b, 1201c), each of which is connected by the network.

The edge network 1300 is provided with a gateway 1302 and LAN switches (1301a, 1301b, 1301c), each of which is connected by the network.

A user such as a company uses the core network 1100 or associated edge networks (1200, 1300) and connects the bases to establish a virtual private network (VPN) 1400.

For instance, the LAN switch 1401a on the user side is connected to the LAN switch 1201a on the side of communications carrier that is located at a base, while the LAN switch 1401b on the user side is connected to the LAN switch 1201c on the side of communications carrier that is located at another base. The LAN switch 1401c on the user side is connected to the LAN switch 1301a on the side of communications carrier that is located at a remote base.

The virtual private network 1400 is configured among the LAN switches 1401a, 1401b, and 1401c on the user side, when the communications carrier provides a tunneling network 1500 in which a packet among the LAN switches 1401a, 1401b, and 1401c on the user side tunnels on the networks of the communication carriers.

An example in which VLAN (Virtual LAN) is used as a technology for configuring a virtual private network is shown here.

In other words, a packet to be transferred among the LAN switches 1401a, 1401b and 1401c on the user side is transferred to a destination set in the LAN switch in accordance with a VLAN tag (12 bit) attached to the packet.

Next, the configuration of the LAN switches (1101, 1201, 1301) will be described with reference to a block diagram of FIG. 2.

Although the example of LAN switches is used in the following description, it is obvious that the similar concept and description is also applicable to other packet transfer unit such as a router.

The LAN switch according to the first embodiment of the present invention has a plurality of LAN switch cards 100 connected to a backplane 200 and functions as one LAN switch.

Each LAN switch card 100 is provided with a CAM (Content Addressable Memory: associative memory) 101 that stores a search table in which search keys are contained, CPU 102 that executes write operation and erase operation of data stored in the CAM 101 and RAM 104, a search engine 103 that executes a registration and search operation of a search key to CAM 101 and determines a transfer destination of a packet based on the search result, RAM 104 that stores FDB or other data, physical layer processor (Physical) 105 constituting a port that is connected to a network and transmits/receives a packet, a transfer engine 106 that not only temporarily stores a packet to be input/output but also extracts header information of the packet and determines a transfer destination of the packet based on the information contained in FDB, and a switch 107 that transmits/receives a packet to and from other LAN switch card 100.

In other words, the input/output unit is configured when the physical layer processor 105 transmits/receives a packet, and the transfer information memory is configured when the RAM 104 stores the FDB that is transfer information. Also, the transfer unit is configured when the transfer engine 106 determines a destination of the packet, and the transfer information acquisition unit is configured when the search engine 103 acquires the transfer information.

In addition, the backplane 200 is provided with a backplane switch 201 and routing processor 202. The backplane switch 201 is connected to the switch 107 of each LAN switch card and transfers a packet from each LAN switch card to a target LAN switch card 100. The routing processor 202 is connected to the CPU 102 of each LAN switch card, stores information of the LAN switch card 100, and controls the destinations to which packets are transferred.

In the following, the operation in the first embodiment of the present invention will be described in accordance with the operation of the LAN switch.

First, when a packet is provided to the LAN switch, the physical layer processor 105 sends the received packet to the transfer engine 106. The transfer engine 106 extracts header information including transfer information such as a sender MAC address, destination MAC address, and VLAN identifier and sends the extracted header information (transfer information) to the search engine 103.

When receiving the transfer information, the search engine 103 generates a search key for searching the CAM 101. The search key is a predetermined character string generated from the packet. Since the search key should be unique to a sender or a receiver, a search key is generated by, for instance, extracting VLAN identifier or MAC (Media Access Control) address from the transfer information.

Then, a search table contained in the CAM 101 is searched by using the generated search key. If the search result shows that an FDB entry corresponding to the transfer information is stored in the RAM 104, the transfer operation of the packet is performed according to the FDB entry.

If the search result reveals that the FDB entry corresponding to the transfer information is not registered in the RAM 104, a new FDB entry is created in accordance with the learning process that conforms to the standard and the created FDB entry is stored in the RAM 104. At this time, the ECC (Error Check and Correct) to the FDB entry is computed and the computed ECC together with the FDB entry is stored in the RAM 104. Thereafter, the search key corresponding to the FDB entry is stored in the search table of the CAM 101. At this time, the search key and the FDB entry are associated and are memorized so that the address at which the search key is contained in the CAM 101 and that of the FDB entry contained in the RAM 104 can be equal. Thus, in the next reception of a packet, the search table of the CAM 101 can be searched based on the search key generated from the packet, an address of the RAM 104 can be acquired from the search result, and the FDB entry (transfer information) contained in the RAM 104 can be acquired from the acquired address.

FIG. 3 shows an example of the search table memorized in the CAM 101 of this embodiment.

As shown in FIG. 3, "Database_Entry" is the address of the CAM 101, and a search key comprised of data of N bits and 1-bit parity (in this embodiment, an odd parity to the search key of the N bits) are stored at each address. When a new search key is stored in the CAN 101, the search engine 103 computes the parity and the search key assigned with the computed parity is stored in the CAM 101.

As discussed above, since the search key is memorized so that the "Database_Entry" (address) can correspond to the FDB address contained in the RAM 104, the FDB entry (transfer information) corresponding to the search key can be acquired by reading the data contained in the RAM 104 by means of the "Database_Entry" (address) corresponding to the search key.

In other words, the transfer information acquisition unit is configured when the CAM 101 memorizes the address of "Database_Entry" that indicates a storage location of the transfer information contained in the FDB.

Now, when a new packet reaches the physical layer processor 105, the physical layer processor 105 transmits the packet to the transfer engine 106. The transfer engine 106 extracts the header information from the received packet and sends it to the search engine 103. The search engine 103 generates a search key from the received header information of the packet and computes a parity. Then, when the search engine sends the generated search key to the CAM 101 and issues a search instruction, a search table of the CAM 101 is searched and an address of the CAM 101 is obtained as the search result.

The search executed by the CAM determines that the search key matches (hits) the search key contained in the CAM when all of the bits in a bit area predefined as a search range by using a mask are positive (in other words, all of the bits are identical) as a computation result of exclusive OR between each bit of the search key and each bit of the search key contained in the CAM, and then, the address (Database_Entry) at which the search key is memorized is output as a search result. In addition, if the search keys do not hit, the search result is not output.

In the example shown in FIG. 3, since the zeroth and first bits of the CAM search key are "1", it matches (hits) the search key and the address "0x0_0002" of the search table is returned as a result, and the search is terminated.

Now suppose that due to the effects of radiations such as alpha ray resulting from impurities contained in chips or cosmic ray (gamma ray), a soft error occurs in the CAM 101 wherein the recorded data suffers from bit inversion and the data is changed, resulting in the bit inversion in a search table of the CAM 101. FIG. 4 shows the state in which the zeroth bit of the search key memorized in the address "0x0_0001 of the search table of the CAM 101 has inverted from "0" to "1". In this case, when the search table is searched by means of the search key generated from the header information of the arriving packet as described above, due to the bit inversion resulting from the soft error, items that match the contents of the search key exist at 2 addresses, namely, "0x0_0001" and "0x0_0002". However, since the parity bit does not match for the search key (address "0x0_0001") where the soft error has occurred, the search key does not hit. In contrast, since the parity bit also matches for the correct entry, the search key hits. Hence, the address "0x0_0002" of the correct search key can be acquired as the search result.

With the mechanism described above, when the search key does not hit in the case of a soft error, the LAN switch broadcasts a packet to a MAC destination written in the packet header, receives a reply to it, and starts a learning process for registering the destination addresses. When the learning process finishes, entries having correct contents is registered in the CAM 101 and the RAM 104 again.

An erroneous entry due to a soft error can be removed in the manner described in the following embodiment, for instance.

In particular, in the service that provides a virtual closed network, for maintaining the integrity of the closed network, it is effective to assign a parity to VLAN identifier for identifying a virtual closed network with the data contained in the CAM 101. Since the searching whether a match can be found including parity is executed, an erroneous hit of a search key having the changed identifier of the virtual closed network due to the soft error that occurred in the CAM 101 can be prevented and acquisition of erroneous transfer information can also be prevented. Therefore, it is possible to prevent the transfer of a packet to an erroneous destination.

Also in this case, the packet for which the search key does not hit is broadcasted to the destination written in the packet header. However, since the range within which a packet can be broadcasted is limited to the inside of the VLAN network to which the packet belongs, the integrity of the closed area can be ensured.

In addition, in order to prevent the erroneous hit due to a soft error, a method of registering more than one search key corresponding to the same search key memorized in a search table is also conceived.

Figure 5:
FIG. 5 is an explanatory diagram of another example of the search table stored in CAM 101 in the first embodiment of the present invention.

FIG. 5 is an example of configuration in which one search key is memorized in two locations (two addresses) in the search table contained in the CAM 101. In this case, since an address in the search table of the CAM 101 must match an address of the FDB in the RAM 104, the FDB entry contained in the RAM 104 is also memorized in two locations (two addresses).

In this case, as shown in FIG. 6, if bit inversion has occurred due to a soft error in one of the two search keys memorized as a pair, the other search key (a search key where no soft error has occurred) matches the search key. The address of the other search key is obtained as a search result, and since the search key hits FDB entry of that address, redundant configuration of important addresses can be achieved.

Although FIGS. 3 and 5 show the examples in which 1-bit odd parity is used, an even parity or parity of other method may be used, or more than one parity bit may be set. For instance, the parity may be generated by using a combination of predetermined bits of the search key, rather than generating one parity to one search key. To be specific, among bits comprising the search key, a first parity is generated from odd bits and a second parity is generated from even bits. In this manner, it is possible to prevent hitting of an erroneous search key even when more than one soft error occurs in the search key.

Figure 7:
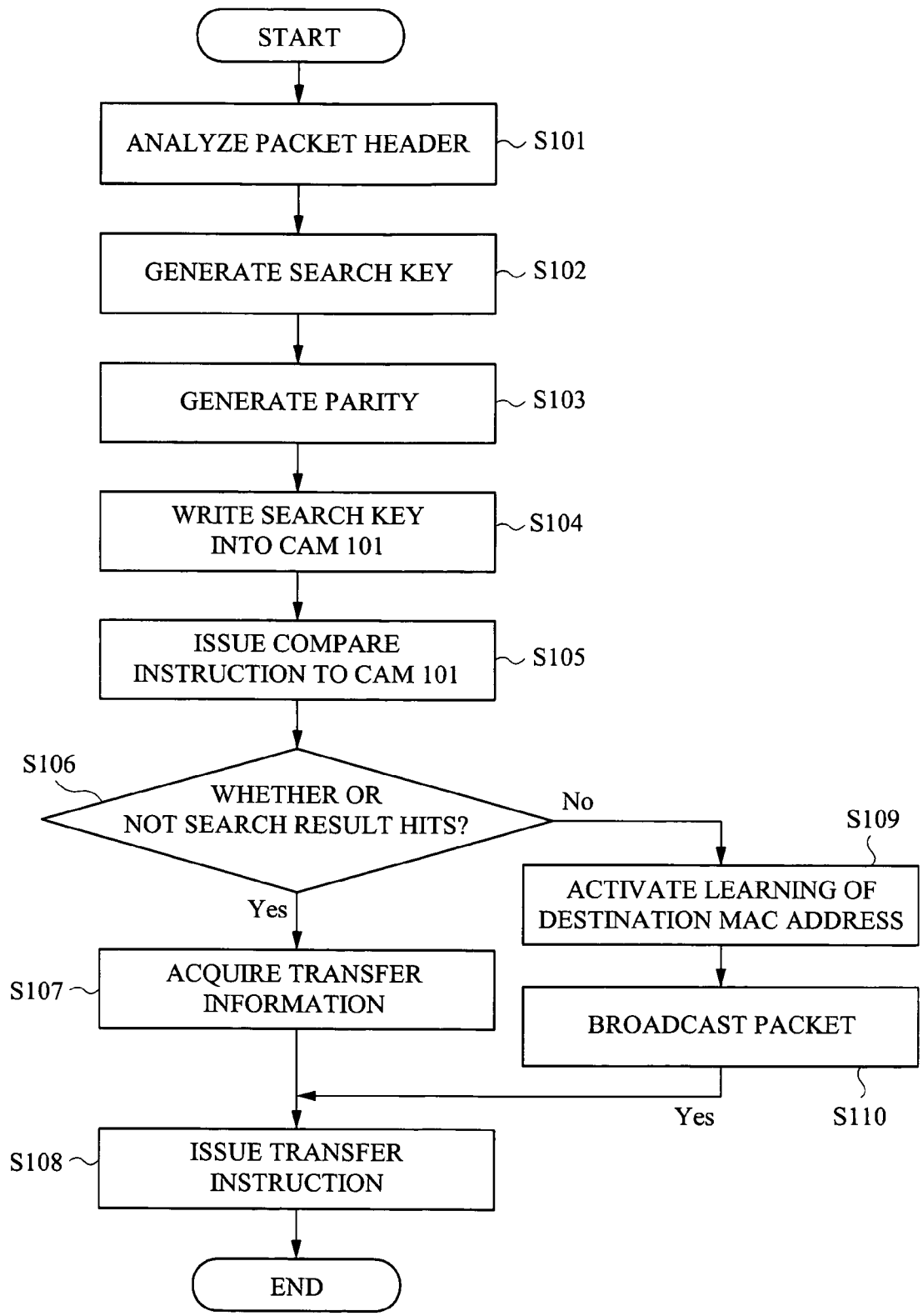
FIG. 7 is a flowchart illustrating search operation of the search table in CAM 101 in the first embodiment of the present invention.

Next, a search operation of the search table of the CAM 101 executed by the search engine 103 in the first embodiment of the present invention will be described with reference to the flowchart of FIG. 7 and taking the LAN switch as an example.

First, the search engine 103 analyzes header information extracted from a packet that the physical layer processor 105 received (S101). Then, the engine 103 generates the search key from the header information of the received packet (S102).

Next, odd parity of all bits of data comprising the search key is computed and the parity is generated (S103). Then, the computed parity is added to the search key generated in S102, and it is written into Compare register of the CAM 101 (S104). Thereafter, Compare instruction is issued to the CAM 101 (S105). The CAM 101 searches to see whether there is any memorized search key that matches (complete match or partial match) the search key written to Compare register. Then, if the search result shows that there is the search key that hits, the CAM 101 outputs an address of the matched search key. When the search engine 103 receives the address as the search result, it determines that there is the search key that hits and shifts to S107. In contrast, if it cannot receive any address as the search result, it determines that there is no search key that hits and shifts to S109 (S106).

In S107, using the address searched by the search key, an FDB entry corresponding to the address is read from the RAM 104 and the transfer information is acquired. Then, the transfer instruction is issued to the transfer engine in accordance with the transfer information (S108).

On the other hand, in the case of the LAN switch, the learning operation of a destination MAC address (see FIG. 8) is activated in S109. In the case of the LAN switch, the packet is broadcasted to the MAC destination written in the packet header (S110). If there is any response to the broadcasted packet, the MAC address is registered to a physical port that responded and the learning operation (learning process) is finished.

When the operation described above ends, the search engine 103 acquires transfer information from the FDB based on the search result by means of the search key generated from the header information of the packet and issues the transfer instruction to the transfer engine 106, thereby sending the packet to a target destination.

Figure 8:
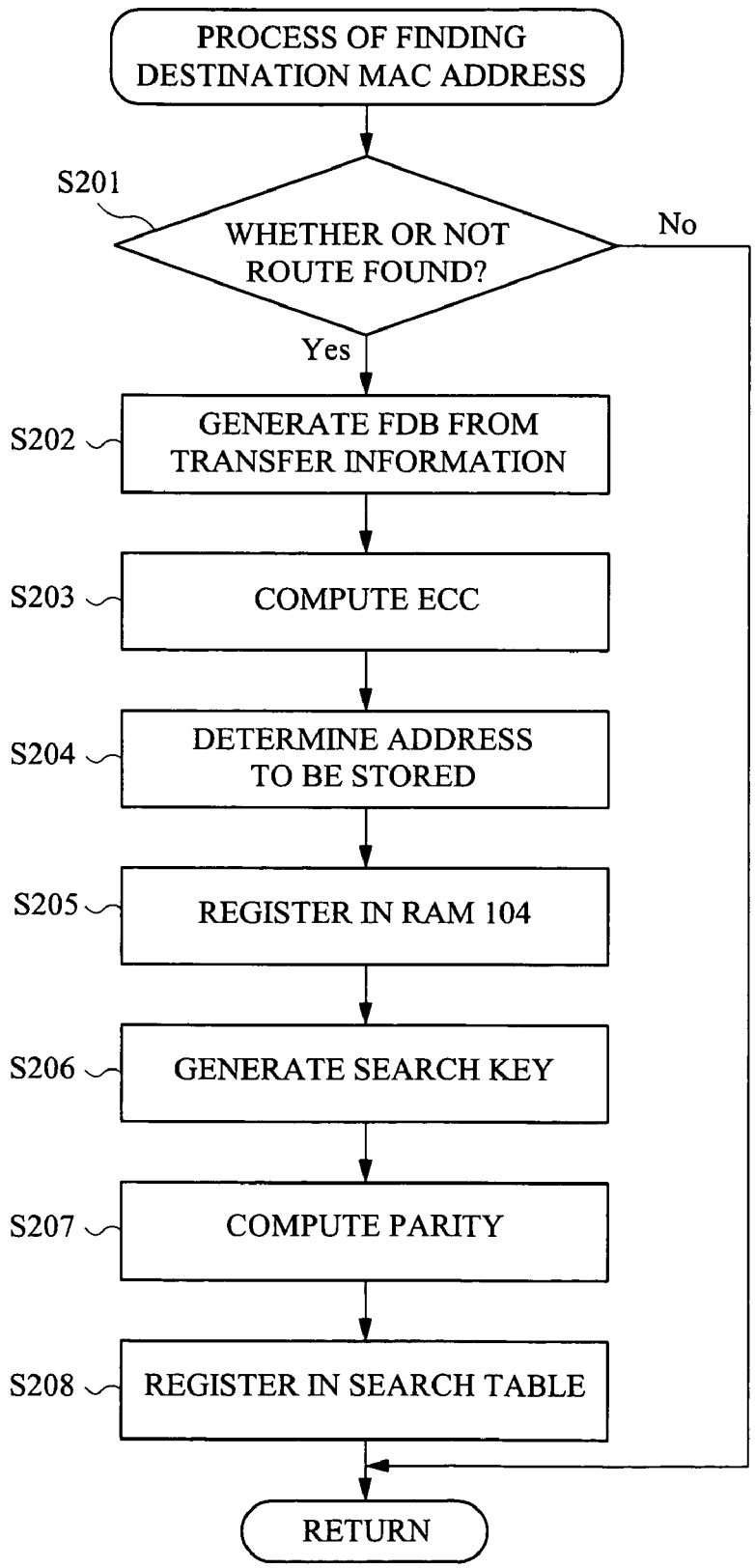
FIG. 8 is a flowchart illustrating route discovery operation for an unregistered destination in the first embodiment of the present invention.

Next, the learning operation of the MAC address of unregistered destination to be executed by the search engine 103 will be described with reference to the flowchart in FIG. 8.

First, the search engine 103 determines whether a route of the packet received with the learning operation of destination MAC address is found or not (S201).

The determination is made by broadcasting a packet to the MAC destination written in the packet header (Sl10) and checking whether or not there is a response to the broadcasted packet. If there is a response, an FDB entry that associates the MAC address with a physical port that responded is generated (S202), and ECC of the generated FDB entry is computed (S203). Then, the address in the RAM 104 where the generated FDB entry is to be stored is determined (S204) and the FDB entry is sent to the RAM 104. Thereafter, Write instruction is issued and the new FDB entry is registered at the address in RAM 104 determined in S204 (S205).

Next, based on the generated FDB entry, a search key to be registered in the search table of the CAM 101 is generated (S206) and a parity of the generated search key is computed (S207).

Then, the search key obtained by adding the parity to the generated search key is sent to the CAM 101 and the Write instruction is issued. By doing so, the new search key is registered in the address associated with the address in the RAM 104 that memorizes the FDB entry determined in S204 (S208).

Note that processes from S201 to S208 may be handled by software.

As described above, in the first embodiment of the present invention, since the parity is added to the search key stored in the CAM 101, it is possible to prevent the erroneous searching of the CAM 101 and also prevent the acquisition of the erroneous transfer information and the transfer of a packet to the erroneous destination. In the VPN consisting of VLAN or VMAN, in particular, although a corresponding VLAN number is likely to exist when data stored in the CAM 101 is inverted, the use of the LAN switch of the present invention can prevent the transfer of a packet to a network of wrong VLAN number even when a soft error occurs.

In addition, since parity is assigned to data (search key) stored in the CAM 101, there is no need for providing the parity by using another hardware configuration.

In the following, as a modified example of the operation in the first embodiment of the present invention, the operation of a router not a LAN switch will be described.

Figure 2:
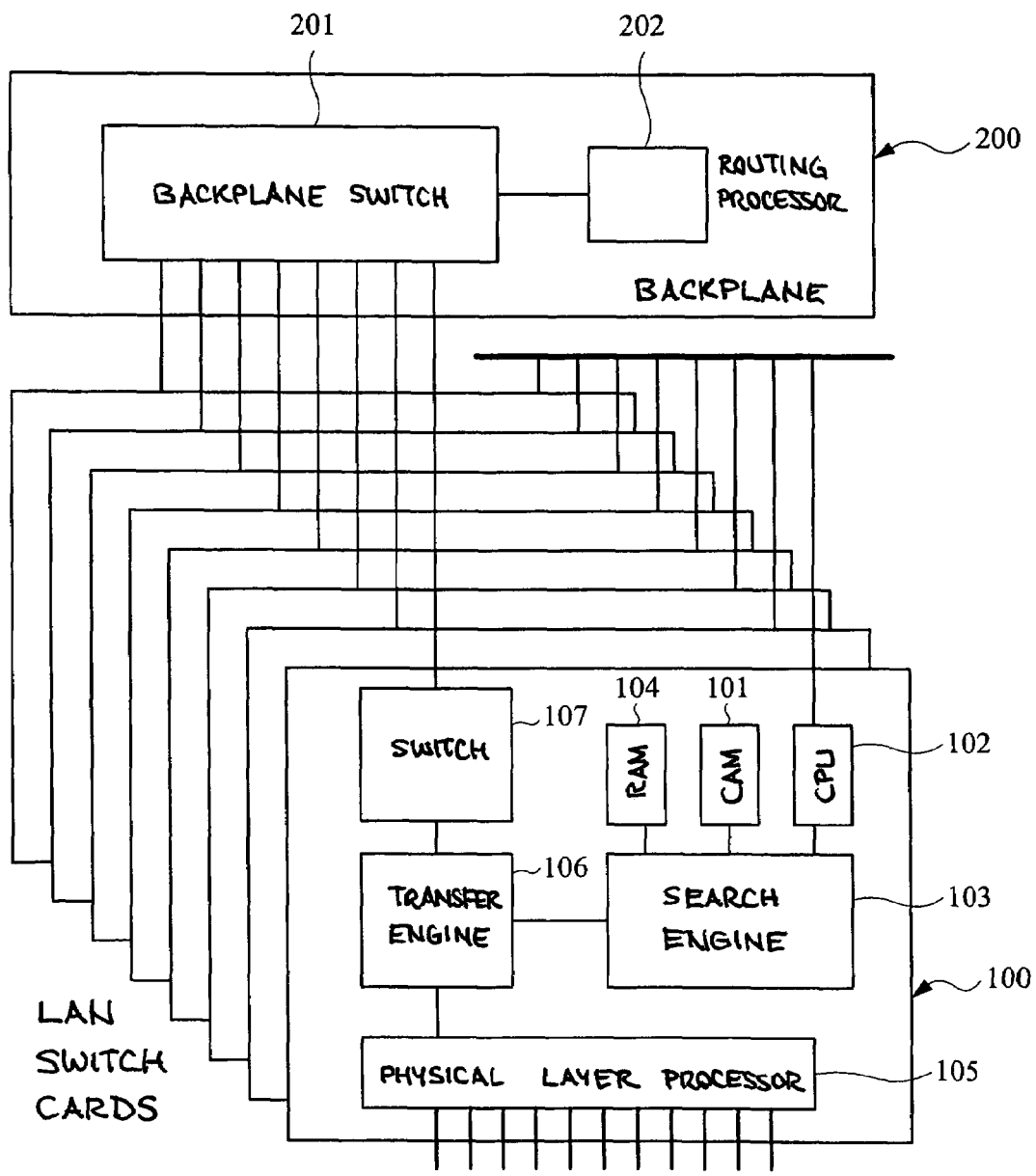
FIG. 2 is a block diagram showing configuration of a LAN switch in the first embodiment of the present invention.

First, when a packet is input to a router shown in FIG. 2, the physical layer processor 105 transmits the received packet to the transfer engine 106. The transfer engine 106 extracts header information including transfer information such as a sender IP address of the received packet, destination IP address, port information, route information, and VPN identifier and transmits the extracted header information (transfer information) to the search engine 103.

When receiving the transfer information, the search engine 103 generates a search key for searching the CAM 101. This search key is a predetermined character string to be generated from a packet, and since it should be unique to a packet sender or receiver, the search key is generated through the extraction of VLAN identifier and MAC (Media Access Control) address from the transfer information.

Then, the search table contained in the CAM 101 is searched by using the generated search key. If the search result shows that an FDB entry corresponding to the transfer information is stored in the RAM 104, the packet is transferred in accordance with the FDB entry.

If the search result shows that no FDB entry corresponding to the transfer information is registered in the RAM 104, the transfer operation to a preset default route is executed, and thereby leaving the process to a different router on the default route.

FIG. 3 shows the example of the search table stored in the CAM 101 in this modified embodiment.

As shown in FIG. 3, "Database_Entry" is an address of the CAM 101 and a search key comprised of data of N bits and 1-bit parity (in this embodiment, an odd parity to the search key of N bits) are memorized for each address. The search engine 103 computes the parity when a new search key is stored in the CAM 101, and the search key assigned with the computed parity is stored in the CAM 101.

As described above, the search key is memorized so that this "Database_Entry" (address) can correspond to an FDB address stored in the RAM 104. Hence, the FDB entry (transfer information) corresponding to the search key can be acquired by reading data stored in the RAM 104 by means of "Database_Entry" (address) corresponding to the search key.

Then, the physical layer processor 105 transmits the packet to the transfer engine 106 when a new packet reaches the physical layer processor 105. The transfer engine 106 extracts header information of the received packet and sends it to the search engine 103. The search engine 103 generates a search key from the header information of the received packet, and calculates parity. Then, when the search engine transmits the generated search key to the CAM 101 and issues search instruction, the search table in the CAM 101 is searched and an address of the CAM 101 is obtained as a search result.

The search executed by the CAM determines that the search key matches (hits) the search key contained in the CAM when all of the bits in a bit area predefined as a search range by using a mask are positive (in other words, all of the bits are identical) as a computation result of exclusive OR between each bit of the search key and each bit of the search key contained in the CAM, and then, the address (Database_Entry) at which the search key is memorized is output as a search result. In addition, if the search keys do not hit, the search result is not output.

In the example shown in FIG. 3, since the zeroth and first bits of the CAM search key are "1", it matches (hits) the search key and the address "0x0_0002" of the search table is returned as a result, and the search is terminated.

Now suppose that a soft error occurs in the CAM 101 and the bit inversion occurs in a search table of the CAM 101. FIG. 4 shows the state in which the zeroth bit of the search key memorized in the address "0x0_0001 of the search table of the CAM 101 has inverted from "0" to "1". In this case, when the search table is searched by means of the search key generated from the header information of the arriving packet as described above, due to the bit inversion resulting from the soft error, items that match the contents of the search key exist at 2 addresses, namely, "0x0_0001" and "0x0_0002". However, since the parity bit does not match for the search key (address "0x0_0001") where the soft error has occurred, the search key does not hit. In contrast, since the parity bit also matches for the correct entry, the search key hits. Hence, the address "0x0_0002" of the correct search key can be acquired as the search result.

With the mechanism described above, when the search key does not hit in the case of a soft error, the router can execute the transfer operation to a preset default route, and thereby leaving the process to a different router on the default route.

In addition, in order to prevent the erroneous hit due to a soft error, a method of registering more than one search key corresponding to the same search key memorized in a search table is also conceived as shown in FIG. 5.

In this case, as shown in FIG. 6, if bit inversion has occurred due to a soft error in one of the two search keys memorized as a pair, the other search key (a search key where no soft error has occurred) matches the search key. The address of the other search key is obtained as a search result, and since the search key hits FDB entry of that address, redundant configuration of important addresses can be achieved.

In a default route, in particular, if a mask is set to "Do Not Care" for a predetermined bit in the address close to the end of the CAM, the search key is configured to hit without fail when there is no other entry to hit. Hence, it is useful to memorize two search keys as a pair as shown in FIG. 6.

In addition, in the service that provides a virtual closed network, for maintaining the integrity of the closed network, it is effective to assign a parity to VLAN identifier for identifying a virtual closed network with the data contained in the CAM 101.

Since the searching whether a match can be found including parity is executed, an erroneous hit of a search key having the changed identifier of the virtual closed network due to the soft error that occurred in the CAM 101 can be prevented and acquisition of erroneous transfer information can also be prevented. Therefore, it is possible to prevent the transfer of a packet to an erroneous destination.

Next, a search operation of the search table in the CAM 101 to be executed by the search ending 103 of this modified example of the present invention will be described with reference to the flowchart of FIG. 7 and by taking a router as an example. In this case, operations in S109 and S110 differ from those of FIG. 7 described above.

First, the search engine 103 analyzes header information extracted from a packet that the physical layer processor 105 received (S101) Then, the engine 103 generates the search key from the header information of the received packet (S102).

Next, odd parity of all bits of data comprising the search key is computed and the parity is generated (S103). Then, the computed parity is added to the search key generated in S102, and it is written into Compare register of the CAM 101 (S104). Thereafter, Compare instruction is issued to the CAM 101 (S105). The CAM 101 searches to see whether there is any memorized search key that matches (complete match or partial match) the search key written to Compare register. Then, if the search result shows that there is the search key that hits, the CAM 101 outputs an address of the matched search key. When the search engine 103 receives the address as the search result, it determines that there is the search key that hits and shifts to S107. In contrast, if it cannot receive any address as the search result, it determines that there is no search key that hits and shifts to S109 (S106).

In S107, using the address searched by the search key, an FDB entry corresponding to the address is read from the RAM 104 and the transfer information is acquired. Then, the transfer instruction is issued to the transfer engine in accordance with the transfer information (S108).

In S109, unlike the operation in FIG. 3 described above, as there is no route information to the destination IP address, an action to handle a fault such as discarding of a packet is taken and a message that cannot reach the destination is sent back to the sending host in accordance with the Internet Control Message Protocol (ICMP) (S110).

Next, the maintenance operation of the route search table to be executed by a router will be described with reference to the flowchart of FIG. 8.

First, a routing processor 202 determines whether any changes such as addition of a new route and deletion of a route have been made through the addition of a static configuration setup and a dynamic routing protocol such as OSPF (S201). If a change has been made, the routing processor calculates a route by the use of new route information, reviews contents of the FDB, and instructs CPU 102 of the result. The CPU 102 generates an FDB entry by following the instruction (S202) and computes ECC of the generated FDB (S203). Then, an address in the RAM 104 where the generated FDB entry is stored is determined (S204). In the determination of the address in the RAM, consideration should be given to the following: an address of entry in the CAM 101 should match an address of the FDB entry in the RAM, and entries should be ordered in the CAM so that "longest Match" can be acquired in the CAM search. When the address in the CAM is determined, the FDB entry is sent to the RAM 104, Write instruction is issued, and a new FDB entry is registered at the address in the RAM 104 determined in S204 (S205).

Next, based on the generated FDB entry, a search key to be registered in the search table of the CAM 101 is generated (S206) and a parity of the generated search key is computed (S207).

Then, the search key obtained by adding the parity to the generated search key is sent to the CAM 101 and the Write instruction is issued. By doing so, the new search key is registered in the address associated with the address in the RAM 104 that memorizes the FDB entry determined in S204 (S208).

Note that processes from S201 to S208 may be handled by software.

In the following, a second embodiment of the present invention will be described.

In a LAN switch according to the second embodiment, duplication of the search table memorized in CAM 101 (master data) is stored in a different memory. Then, the master data is compared with the search table at a predetermined timing. If any difference in both (error in the search table) is found, the error in the search table is corrected by writing the master data into the search table. Note that the same reference numerals are given to the configuration identical to those of the first embodiment and description thereof will be omitted.

Figure 9:
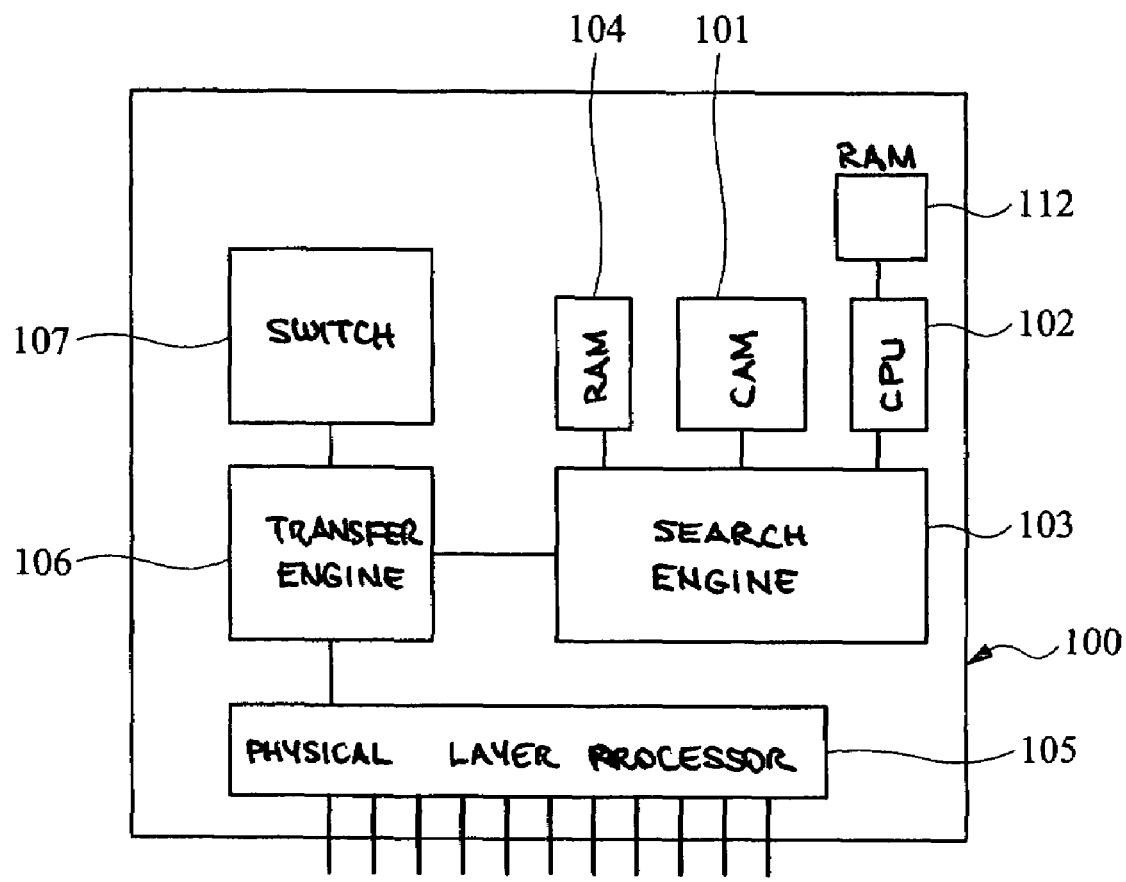
FIG. 9 is a block diagram showing configuration of a LAN switch in a second embodiment of the invention.

FIG. 9 is a block diagram showing configuration of a LAN switch card in the second embodiment.

RAM 112 is connected to CPU 102 and stores duplication (master data) with same contents as the search table contained in the CAM 101. When a new search key is registered in the search table of the CAM 101 (for instance, in S208 of FIG. 8 described above), the master data is memorized in the RAM 112 by duplicating the contents of the registration into the CAM 101 (or the entire search table to be contained in the CAM 101). In other words, a duplication memory is configured when the RAM 112 memorizes the duplication of the search table.

The CPU 102 checks this search table memorized in this CAM 101 against the master data stored in the RAM 112 at a predetermined timing (for instance, when no process to the CAM 101 has been done for a certain period of time). At this time, if any data error due to a soft error and the like is found, the error in the search table of the CAM 101 is corrected with the master data of the RAM 112.

Figure 10:
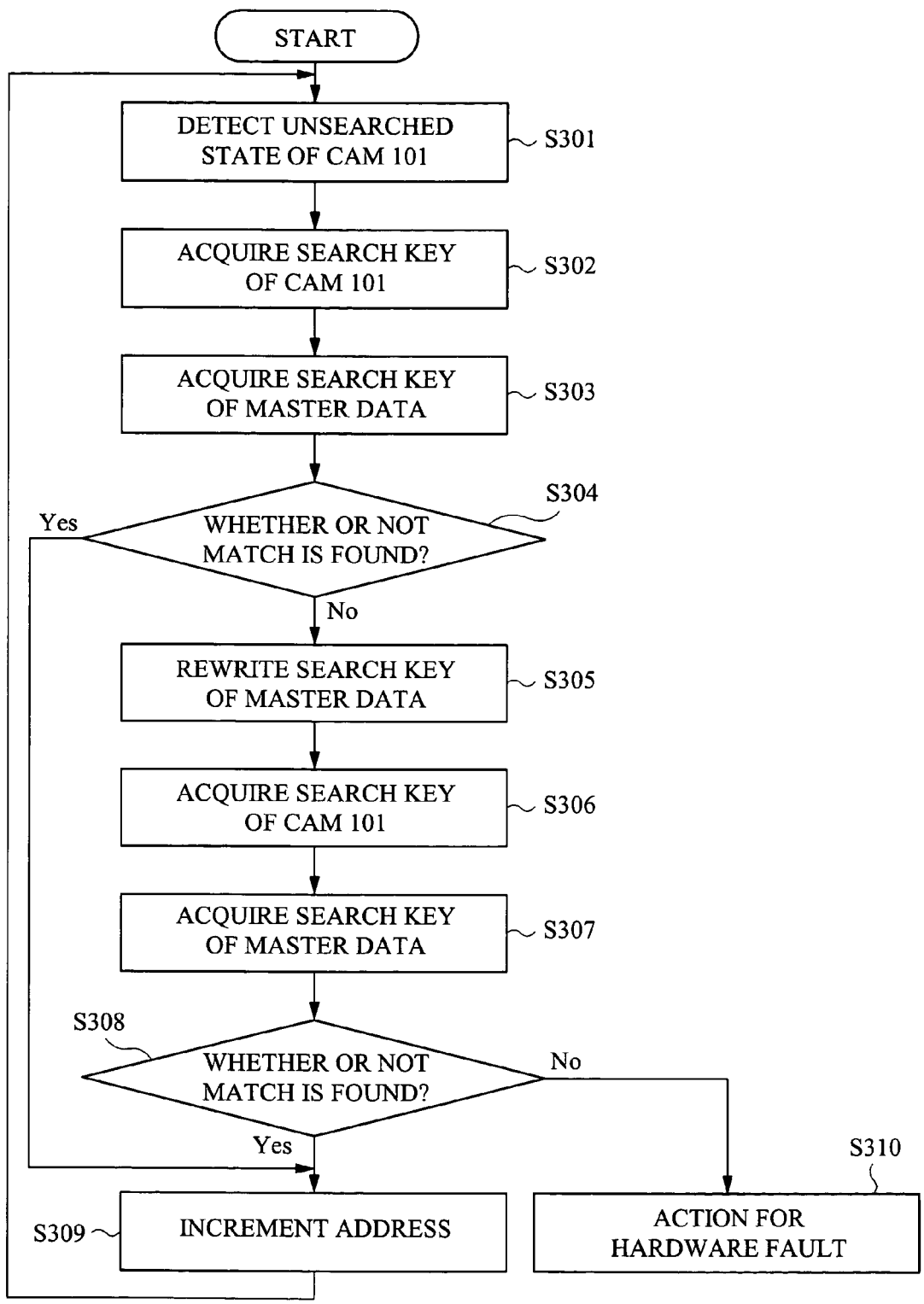
FIG. 10 is a flowchart of error correction operation of the search table stored in CAM 101 in the second embodiment of the present invention.

Next, an error correction operation of the search table memorized in the CAM 101 executed by the CPU 102 in the second embodiment of the present invention will be described by using the flowchart in FIG. 10.

The CPU 102 monitors to see whether the search engine 103 has executed a process to the CAM 101 (searching, writing, and the like) by using the timer and detects unsearched state of the CAM 101 (S301). More specifically, if the process to the CAM 101 has been done, the CPU resets the timer and determines that the CAM 101 is in an unsearched state if the timer exceeds a predetermined time (the process to the CAM 101 has not been executed for a predetermined period of time). Then, it issues Read instruction to a search key at a predetermined address of the search table in the CAM 101 and reads the memory contents of the corresponding address in the CAM 101 to acquire the search key (S302). Then, it reads the memory contents of a corresponding address from the master data memorized in the RAM 112 and acquires the search key (S303). Thereafter, it compares the acquired search keys to determine whether or not both keys match (S304). If the comparison result shows that both keys match, processes from S305 to S308 are not executed and process of S309 is executed. If they do not match, process of S305 is executed.

In S305, the CPU issues Write instruction to the CAM 101 and writes the search key acquired from the master table in the RAM 112 over the corresponding address. Then, it issues address Read instruction of the written search key and reads the memory contents of the corresponding address of the CAM 101 to acquire the search key written in S305 (S306). Thereafter, it reads the memory contents of the corresponding address from the master table contained in the RAM 112, acquires the search key (S307), and compares the acquired search keys (S308). If the comparison result shows that both keys match, process of S309 is executed. If not, process of S310 is executed. In S309, the predetermined address set in S301 is incremented by 1 and process of S301 is executed. All search keys in the search table are sequentially compared by executing the processes from S301 to S308 to the updated address. If there is any error in the search table, the error is corrected.

In S310, an action to handle a hardware fault such as notification of a warning indicating that a fault has occurred in a memory is done and the process ends.

Note that processes from S201 to S208 may be handled by software.

The second embodiment of the present invention configured as described above can achieve the following effects in addition to the effect of the first embodiment. That is, since the duplication of the search table in the CAM 101 is memorized, the error can be detected and corrected through the process in the background even when a soft error occurs in the search table contained in the CAM 100. In addition, when the hardware fault occurs in the CAM 101, it is possible to sense such a fault.

What is claimed is:

1. A packet transfer unit, comprising:
an input/output unit which transmits/receives a packet;
a transfer unit which extracts header information from a received packet and determines a transfer destination of said packet;
a transfer information memory which stores transfer information for determining the transfer destination of said packet; and
a transfer information acquisition unit which acquires the transfer information of said packet from said transfer information memory, wherein
said packet transfer unit further comprises: a search key memory which stores a search key for the transfer destination of said packet and parity information generated from the search key, in association with a storage location of the transfer information memorized in said transfer information memory, said transfer information acquisition unit searches said search key memory by using the search key generated based on said header information and the parity information generated from the search key, acquires storage location information of said transfer information from said search key memory when a match with said search key and said parity information stored in said search key memory is found, and acquires the transfer information memorized in said transfer information memory based on said acquired storage location information, and said transfer unit transfers the received packet based on said acquired transfer information.

2. The packet transfer unit according to claim 1, wherein said search key memory stores a plurality of pairs of said search key and said parity information in a plurality of areas, and said transfer information acquisition unit acquires the storage location information of said transfer information from said search key memory when a match of all of the pairs of said search key and said parity information memorized in said plurality of areas is found.

3. The packet transfer unit according to claim 1, wherein said parity information consists of first parity information to be generated by computing a plurality of bit values of said search keys and second parity information to be generated by computing bit values other than said plurality of bits.

4. The packet transfer unit according to claim 1, wherein said packet transfer unit comprises: a duplication memory which stores duplication of the search key and parity information stored in said search key memory; and a search key correction unit which compares the search key and parity information stored in said search key memory with a search key and parity information stored in said duplication memory and rewrites the search key and parity information stored in said search key memory by using the search key and parity information stored in said duplication memory if contents of both memories differ.

5. A method of acquiring transfer information used in a packet transfer unit which comprises: Using a packet transfer unit that includes an input/output unit which transmits/receives a packet, a transfer unit which determines a transfer destination of said packet; a transfer information memory which stores transfer information for determining the transfer destination of said packet; a transfer information acquisition unit which acquires the transfer information of said packet from said transfer information memory; and a search key memory which stores a search key for the transfer destination of said packet and parity information generated from the search key, in association with a storage location of the transfer information memorized in said transfer information memory; searching said search key memory by using a search key generated based on header information extracted from a received packet and parity information generated from the search key;

acquiring storage location information of said transfer information from said search key memory, when a match with the search key and parity information stored in said search key memory is found; and acquiring transfer information stored in said transfer information memory based on said acquired storage location information.

6. A method of registering a search key used in a packet transfer unit which comprises: using a packet transfer unit that includes an input/output unit which transmits/receives a packet; a transfer unit which determines a transfer destination of said packet; a transfer information memory which stores transfer information for determining the transfer destination of said packet; a transfer information acquisition unit which acquires the transfer information of said packet from said transfer information memory, and a search key memory which stores a search key for the transfer destination of said packet and parity information generated from the search key, in association with a storage location of the transfer information memorized in said transfer information memory; storing transfer information which can be the transfer destination of said packet into said transfer information memory; generating a search key based on the header information stored in said transfer information memory; generating parity information by computing a plurality of bit values of said search key; and storing said generated search key and parity information into said search key memory when a match with said search key and said parity information is not found.

7. The method of registering the search key according to claim 6, wherein a plurality of pairs of said search key and said parity information are memorized in a plurality of areas of said search key memory.

8. The method of registering the search key according to claim 6, wherein first verification information to be generated by computing said plurality of bit values of the search keys and second parity information to be generated by computing bit values other than the plurality of bits are memorized in said search key memory as said parity information.

9. A method of correcting an error of a search key used in a packet transfer unit which comprises: using a packet transfer unit that includes an input/output unit which transmits/recieves a packet; a transfer unit which determines a transfer destination of said packet; a transfer information memory which stores transfer information for determining the transfer destination of said packet; a transfer information acquisition unit which acquires the transfer information of said packet from said transfer information memory; a search key memory which stores a search key for the transfer destination of said packet and parity information generated from the search key, in association with a storage location of the transfer information memorized in said transfer information memory; and a duplication memory which stores duplication of the search key and parity information stored in said search key memory, the search key being generated based on header information extracted from said packet; comparing the search key and parity information stored in said search key memory with a search key and parity information stored in said duplication memory; and rewriting the search key and parity information stored in said search key memory by using the search key and parity information stored in said duplication memory when contents of both memories differ.

10. The method of correcting an error of the search key according to claim 9, comprising the steps of reading out the rewritten search key and, parity information; comparing said read search key and parity information with the search key and verification information stored in said duplication memory; and determining whether or not contents of both memories match.

11. A network system connected with and comprised of a server which transmits/receives a packet and a packet transfer unit which transfers a packet, wherein said packet transfer unit comprises:

an input/output unit which transmits/receives a packet;

a transfer unit which extracts header information from the received packet and determines a transfer destination of said packet; a transfer information memory which stores transfer information for determining the transfer destination of said packet;

a transfer information acquisition unit which acquires the transfer information of said packet from said transfer information memory; and a search key memory which stores a search key for the transfer destination of said packet and parity information generated from the search key, in association with a storage location of the transfer information stored in said transfer information memory, said transfer information acquisition unit searches said search key memory by using the search key generated based on said header information and the parity information generated from the search key, acquires storage location information of said transfer information from said search key memory when a match with said search key and said parity information stored in said search key memory is found, and acquires the transfer information memorized in said transfer information memory based on said acquired storage location information, and said transfer unit transfers the received packet based on said acquired transfer information.

12. The network system according to claim 11, wherein said server and said packet transfer unit comprise a virtual private network.

13. A method of acquiring transfer information used in a packet transfer unit which comprises: using a packet transfer unit that includes an input/output unit which transmits/receives a packet; a transfer unit which determines a transfer destination of said packet; a transfer information memory which stores transfer information for determining the transfer destination of said packet; a transfer information acquisition unit which acquires the transfer information of said packet from said transfer information memory; and a search key memory which stores a search key for the transfer destination of said packet and parity information generated from a virtual private network identifier in the search key, in association with a storage location of transfer information stored in said transfer information memory; searching said search key memory by using the search key generated based on header information extracted from the received packet and the parity information generated from the virtual private network identifier in the search key; acquiring storage location information of said transfer information from said search key memory when a match with the search key and parity information stored in said search key memory is found; and acquiring transfer information stored in said transfer information memory based on said acquired storage location information.

14. A method of acquiring transfer information used in a packet transfer unit which comprises: using a packet transfer unit that includes an input/output unit which transmits/receives a packet, a transfer unit which determines a transfer destination of said packet; a transfer information memory which stores transfer information for determining the transfer destination of said packet; a transfer information acquisition unit which acquires the transfer information of said packet from said transfer information memory; and a search key memory which stores a search key for the transfer destination of said packet and parity information generated from the Virtual LAN identifier in the search key, in association with a storage location of transfer information stored in said transfer information memory; searching said search, key memory by using the search key generated based on header information extracted from the received packet and parity information generated from the Virtual LAN identifier in the search key; acquiring storage location information of said transfer information from said search key memory when a match with the search key and parity information stored in said search key memory is found; and acquiring transfer information stored in said transfer information memory based on said acquired storage location information.

15. The packet transfer unit according to claim 1, wherein said packet is broadcasted to the MAC destination written in said packet header and said search engine determines whether a route of said packet is found or not, when a match with said search key and said parity information stored in said search key memory is not found.

16. The packet transfer unit according to claim 1, wherein said packet is discarded and a message that said packet cannot reach the destination is sent back to the sending host and a routing processor determines whether any changes of a route have been made, when a match with said search key and said verification information stored in said search key memory is not found.

17. The method of acquiring transfer information according to claim 5, wherein said packet is broadcasted to the MAC destination written in said packet header and said search engine determines whether a route of said packet is found or not, when a match with said search key and said parity information stored in said search key memory is not found.

18. The method of acquiring transfer information according to claim 5, wherein said packet is discarded and a message that said packet cannot reach the destination is sent back to the sending host and a routing processor determines whether any changes of a route have been made, when a match with said search key and said parity information stored in said search key memory is not found.

19. The method of registering the search key according to claim 6, wherein said packet is broadcasted to the MAC destination written in said packet header and said search engine determines whether a route of said packet is found or not, when a match with said search key and said parity information stored in said search key memory is not found.

20. The method of registering the search key according to claim 6, wherein said packet is discarded and a message that said packet cannot reach the destination is sent hack to the sending host and a routing processor determines whether any changes of a route have been made, when a match with said search key and said parity information stored in said search key memory is not found.

21. The network system according to claim 11, wherein said packet is broadcasted to the MAC destination written in said packet header and said search engine determines whether a route of said packet is found or not, when a match with said search key and said parity information stored in said search key memory is not found.

22. The network system according to claim 11, wherein said packet is discarded and a message that said packet cannot reach the destination is sent back to the sending host and a routing processor determines whether any changes of a route have been made, when a match with said search key and said parity information stored in said search key memory is not found.

* * * * *